(12) United States Patent
Cherny

(10) Patent No.: US 6,219,646 B1
(45) Date of Patent: Apr. 17, 2001

(54) METHODS AND APPARATUS FOR TRANSLATING BETWEEN LANGUAGES

(75) Inventor: Julius Cherny, Monsey, NY (US)

(73) Assignee: Gedanken Corp., Monsey, NY (US)

( * ) Notice: Subject to any disclaimer, the term of this patent is extended or adjusted under 35 U.S.C. 154(b) by 0 days.

(21) Appl. No.: 09/567,824

(22) Filed: May 9, 2000

Related U.S. Application Data

(62) Division of application No. 08/733,808, filed on Oct. 18, 1996, now Pat. No. 6,085,162.

(51) Int. Cl.[7] .......................... G01L 21/00; G01L 17/21; G01L 17/20
(52) U.S. Cl. .................. 704/277; 704/260; 704/235; 704/251; 704/256; 704/10; 704/8; 704/3
(58) Field of Search .................... 704/277, 270, 704/235, 246, 251, 256, 257, 255, 231, 9, 10, 2, 3; 707/1

(56) References Cited

U.S. PATENT DOCUMENTS

| | | | |
|---|---|---|---|
| 4,706,212 | * 11/1987 | Toma | 704/2 |
| 5,220,503 | * 6/1993 | Suzuki et al. | 704/2 |
| 5,268,839 | * 12/1993 | Kaji | 704/3 |
| 5,442,780 | * 8/1995 | Takanashi et al. | 707/1 |
| 5,535,120 | * 7/1996 | Chong et al. | 704/3 |
| 5,695,980 | * 12/1997 | Brew | 704/273 |
| 5,848,389 | * 12/1998 | Asano et al. | 704/239 |
| 6,085,162 | * 7/2000 | Cherny | 704/277 |

* cited by examiner

*Primary Examiner*—David Hudspeth
*Assistant Examiner*—Vijay B Chawan
(74) *Attorney, Agent, or Firm*—Fish & Neave; Robert W. Morris

(57) ABSTRACT

Methods and apparatus for performing translation between different language are provided. The present invention includes a translation system that performs translation having increased accuracy by providing a three-dimensional topical dual-language database. The topical database includes a set of source-to-target language translations for each topic that the database is being used for. In one embodiment, a user first selects the topic of conversation, then words spoken into a telephone are translated and produced as synthesized voice signals from another telephone so that a near real-time conversation may be had between two people speaking different languages. An additional feature of the present invention is the addition of a computer terminal that displays the input and output phrases so that either user may edit the input phrases, or indicate that the translation was ambiguous and request a rephrasing of the material.

15 Claims, 6 Drawing Sheets

METHODS AND APPARATUS FOR TRANSLATING BETWEEN LANGUAGES

CROSS-REFERENCE TO RELATED APPLICATION

This application is a divisional of U.S. patent application Ser. No. 08/733,808, filed Oct. 18, 1996, that issued as U.S. Pat. No. 6,085,162, which is incorporated by reference in its entirety.

BACKGROUND OF THE INVENTION

The present invention relates to translating from one language to another. More particularly, the present invention relates to providing translation between languages based, at least in part, on a user selecting a particular topic that the translation focuses on.

Translation between languages is well known. In the most basic sense, translation is performed manually by individuals that are fluent in both the source and target languages. Human translators have the ability to translate written or spoken text, with a very high degree of accuracy, almost instantaneously. Additionally, human translation is often more accurate because the translator is often very knowledgeable regarding the topic or subject matter that the communication is based on.

Even though human translations are often very accurate, they are also very expensive—requiring individuals having very specialized skills. Besides the basic expense, which can be prohibitive, many instances requiring translation require people having additional knowledge that further increases costs. For example, if two biotechnology scientists who spoke different languages needed to communicate, the translator would need to have, in addition to being fluent in both languages, knowledge in biotechnology so that many "terms of art" would be translated with their proper meaning.

An additional problem with human translation is the small availability of qualified individuals to perform such tasks. There have been many attempts to address the problems of labor-intensive human translation practices. Often, these attempts have involved the use of electronic devices to translate written text from one language to another.

For example, Masuzawa et al. U.S. Pat. No. 4,393,460 discloses an electronic translator that uses a voice responsive circuit to input words in one language, processing circuitry that translates the words to a second language, and a voice synthesis circuit for "speaking" the translated words in the second language. The translation is based on the operation of three "analyzers" that analyze the characters of a word, the syntax and the frequency of words. One deficiency of the system described by Masuzawa is that it relies on a single set of rules and "difficult to understand" sentences for each language. This invariably leads to translation errors, especially when specialized topics are the subject of the translation.

Another translation system is described in Okamoto et al. U.S. Pat. No. 4,805,732. Okamoto discloses a machine having an input section, a dictionary section that stores linguistical information, a processing section and an output section. The output section includes a display and the capability to permit the user to edit either the input text or the translated text. Okamoto, however, suffers from at least the same deficiency as Masuzawa, namely that translation is based on a single set of rules for a given language.

Fukumochi et al. U.S. Pat. No. 5,299,124 describes a translation machine that is specifically directed toward syntactic sentence analysis. The input sentence is divided into words by a dictionary/morpheme analyzer. The translated word is matched up with grammatical information for each word to derive tense, person and quantity information (i.e., singular or plural). A syntactic analyzer forms a structure-analyzing tree based on the dictionary translation and grammatical rules for the sentence. If the tree fails, the sentence is broken apart into smaller pieces and reprocessed until a successful translation occurs. Fukumachi, however, also applies a single set of rules for each language.

Frantz et al. U.S. Pat. No. 4,507,750 attempts to address some of the deficiencies described above. Frantz, noting that a word for word translation is insufficient for accurate translation, describes a system that analyzes the context within a given sentence to overcome various problems, such as dealing with homonyms, incurred by other translation devices. While Frantz does deal with simple problems, such as differentiating between to, too and two, Frantz still relies on a single set of rules per language.

For at least the above reasons, it is an object of the present invention to provide a translation system that translates between languages depending on the topic of the information being translated.

It is also an object of the present invention to provide a translation system that relies on multiple rule bases for a given language to increase translation accuracy.

It is a still further object of the present invention to provide a translation system that utilizes multiple dictionaries to translate between a first and a second language.

SUMMARY OF THE INVENTION

The above and other objects of the present invention are accomplished by the systems and methods described herein in which translation between two languages is based, at least in part, on the selection of a topic that the communication is based upon. The translation system and method of the present invention includes what may be referred to as a "three-dimensional" data base that is built for each pair of languages. The three dimensions include the source language, the target language and the topic (or subject matter on which the communication is based). Each cell in the data base includes information for each topic relating to, for example, frequency of association, synonyms and topic-related dictionary definition.

The principles of the present invention may be applied to a variety of systems and methods to automatically perform highly accurate translations. In one embodiment, topical dictionaries are constructed by scanning (or other conventional means) various documents of material. For example, to establish a data base level (i.e., one level of the three-dimensional data base) related to microbiology, various articles from microbiology trade publications would be scanned. The scanned material may be passed through a parser that assigns the words to word classes. The input material is then applied to a conventional dual-language dictionary that produces target language translations.

At the same time as the source language material is being scanned, a similar process is carried out on the target language using various documents in the target language (that are related to the same topic). The end result is two files of words in one language with associated translations. The two files are then processed via some form of pattern recognition routines to compute the forward and backward frequency of association between the two files. This process produces one level of the three-dimensional topic data base (i.e., for the selected topic).

Once the three-dimensional topic data is established for a given topic, the system may be used in many ways. One embodiment is a system in which two individuals that speak different languages can talk to each other over the telephone with the system providing near real-time translation (each caller would pause slightly after speaking). Voice recognition circuitry converts the analog signals received from a microphone (or a digitized version of those signals) into signals for processing. The processing circuitry converts the signals into words that are then applied against the topical data base, and a conventional dual language data base, to translate the text. The translated text is synthesized and transmitted to the other caller.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE DRAWINGS

The systems and methods of the present invention for translating between languages include a processing system that utilizes a three-dimensional data base (for multiple topics) to provide highly accurate translation. Each "level" in the data base provides translation between two languages for a given topic (e.g., biotechnology, high-frequency electronic circuits, medical technology, etc.). Also included are conventional dual-language dictionaries (i.e., not topical) that are used to complement the translation performed by processor using the topical dictionary.

Figure 1:
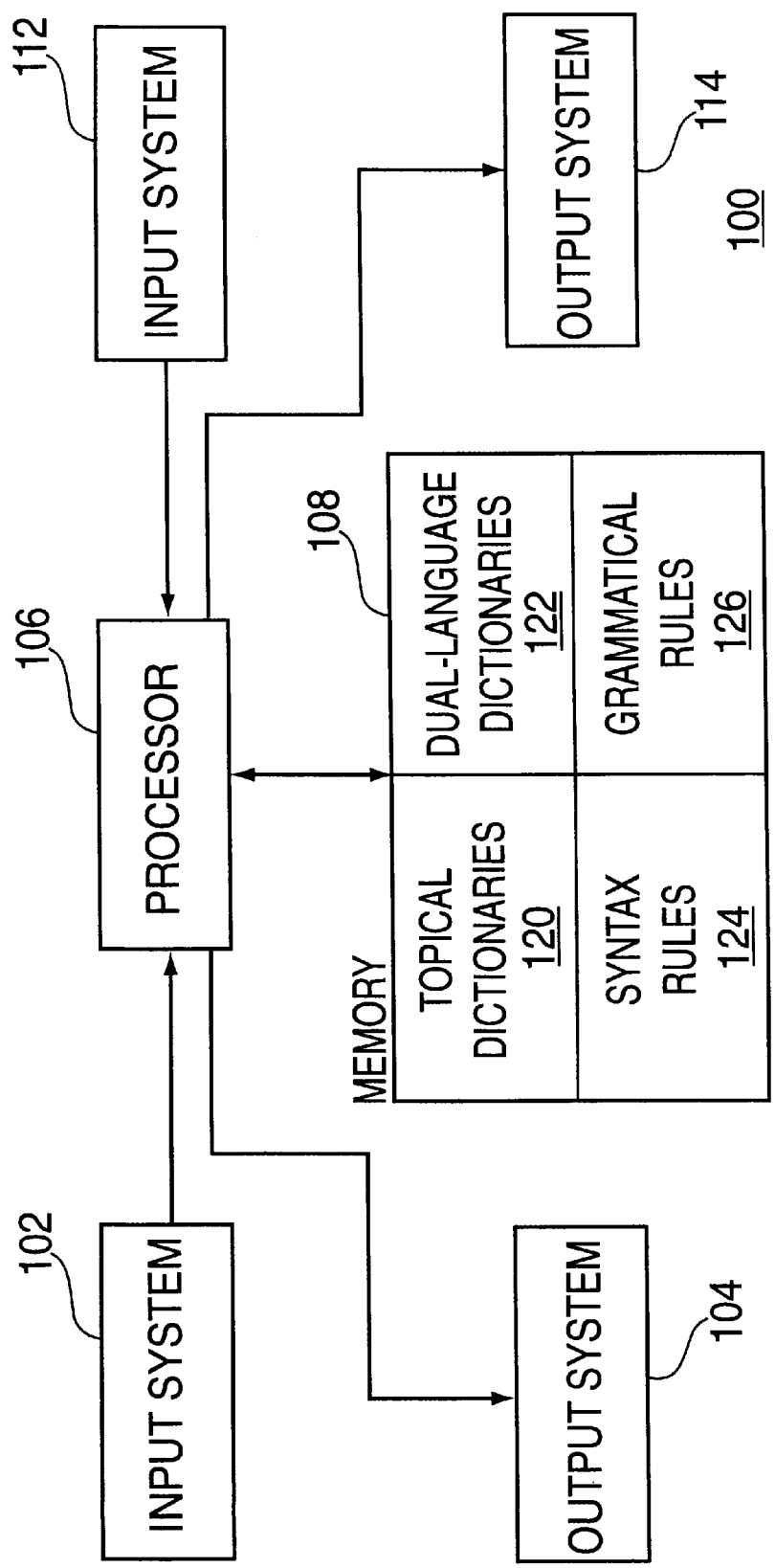
FIG. 1 is a block diagram showing one embodiment of a translation system constructed in accordance with the principles of the present invention.

FIG. 1 shows a general representation of a system for performing translation between languages in accordance with the principles of the present invention. Translation system 100 includes input systems 102 and 112, output systems 104 and 114, processor 106 and memory 108. Memory 108 may include permanent storage capabilities (e.g., hard drives or magneto-optical drives), as well as temporary storage (e.g., DRAM). At least a portion of memory 108 is temporary storage that includes partitions for topical dictionaries 120, dual-language dictionaries 122, syntax rules 124 and grammatical rules 126. Each of portions 120–126 may be stored in permanent storage while system 100 is not operational, and loaded into temporary storage as part of the start-up procedure for system 100.

Figure 2:
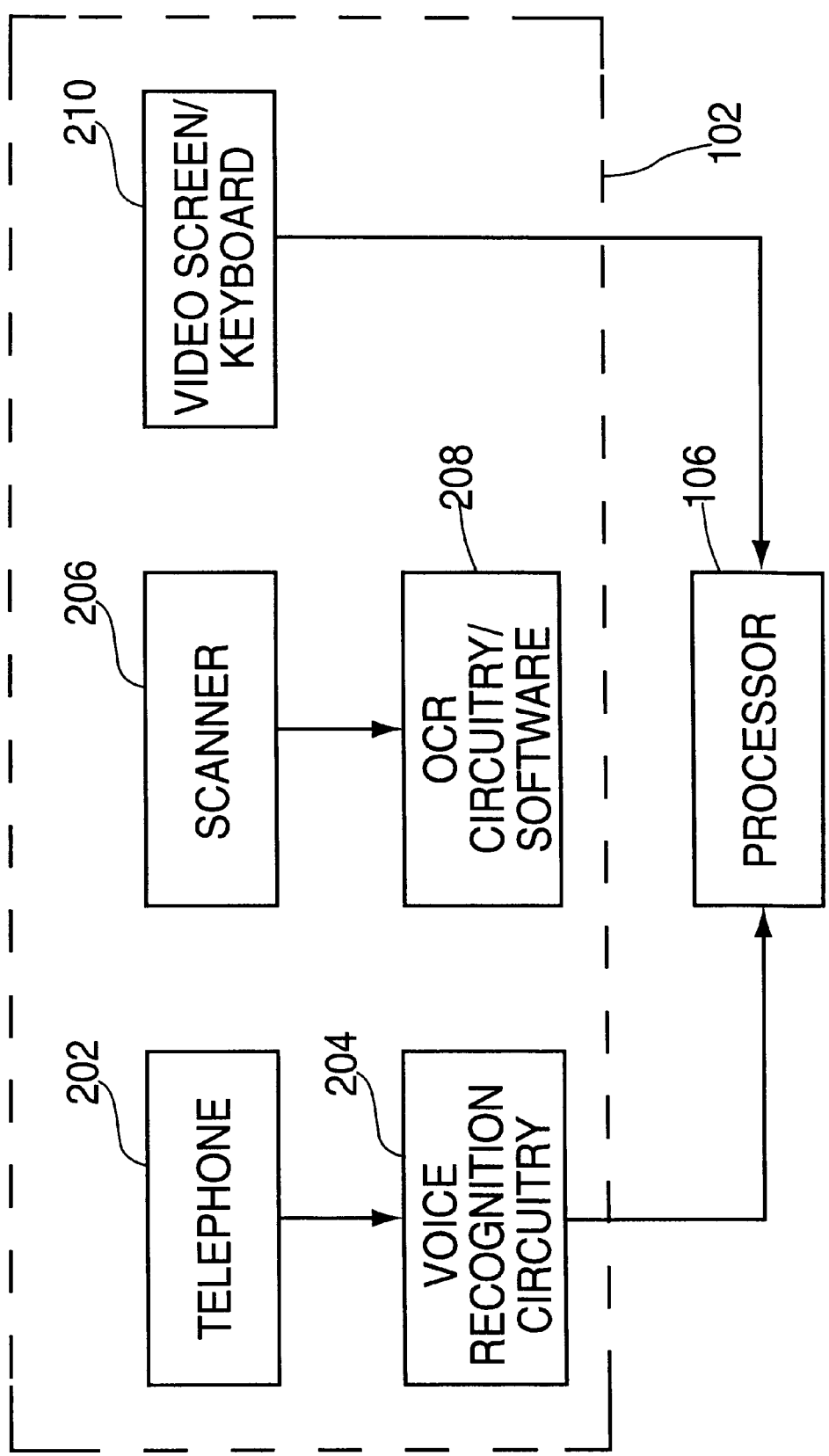
FIG. 2 is a block diagram showing various illustrations of possible input systems for the translation system of FIG. 1.

Translation system 100 may be used to create or modify topical dictionaries 120 or dual-language dictionaries 122 by providing additional information to system 100 via input systems 102 and 112. FIG. 2 shows some of the various ways in which information may be input into system 100 via input system 102. Persons skilled in the art will appreciate that, although three specific implementations of input devices circuitry are shown in FIG. 2, the principles of the present invention may be carried out by a system that includes any of the input devices/circuits, any combination of those devices, as well as other known devices that can receive language information and circuitry that converts that information into signals for computer processing (e.g., a simple microphone and voice recognition circuitry).

Input system 102 may, for example, include telephone 202 to receive voice inputs and voice recognition circuitry 204 to convert those voice inputs into signals that processor 206 can process as "text." Input system 102 may also include scanner 206 (or input system 102 may include scanner 206 instead of telephone 202) to input printed text into system 100. In conjunction with scanner 206, optical character recognition (OCR) circuitry software 208 is provided to convert the scanned signals into "text." OCR 208 may reside within scanner 206, may be independent hardware, or may reside within processor 106 (a somewhat less desirable configuration due to the additional loading placed on processor 106).

Another option for input system 102 is video screen/keyboard 210, which may be a dedicated personal computer, a stand-alone video touchscreen that permits the selection of inputs by touching the screen, or a terminal connected to a server or main-frame. Video/keyboard 210 enables a user to make direct inputs into system 100 and, when used as part of output systems 104 and 114, may enable the user to edit the input text, the translated text, or both, as is described in more detail below. Additionally, while FIG. 2 has been described as applying to input system 102, persons skilled in the art will appreciate that the same principles may be applied to input system 112 without departing from the spirit of the present invention.

Output system 104, on the other hand, may also include a telephone 302 coupled to voice synthesis circuitry 304 that converts the translated text into voice signals in the translated language. Of course, depending on the configuration, telephones 202 and 302 may be a single telephone, depending on whether the telephone is being used as an input device or an output device. When telephones 202 and 302 are a single telephone, voice recognition circuitry 204 and voice synthesis circuitry 304 are also preferably a single electronic device that performs both functions. Output system 104 may also include printer 206 (or output system 104 may include printer 306 instead of telephone 302) to print text that was translated by system 100.

Figure 3:
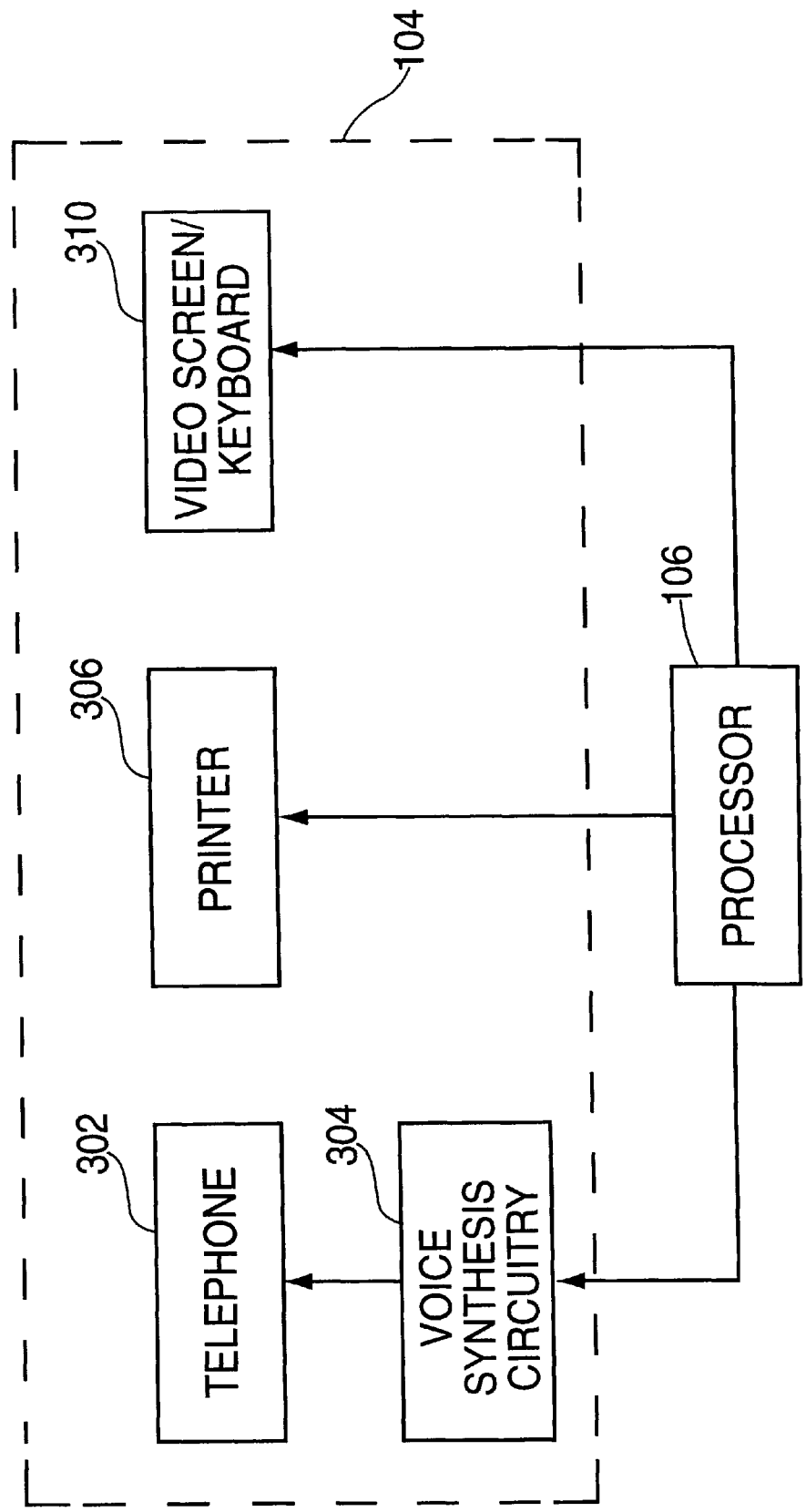
FIG. 3 is a block diagram showing various illustrations of possible output systems for the translation system of FIG. 1.

Output system 104 may instead include video screen/keyboard 310, which may be a dedicated personal computer, a stand-alone video touchscreen that permits the selection of inputs by touching the screen, or a terminal connected to a server or main-frame. Video/keyboard 310 enables a user to receive translation information from system 100 that, when used in conjunction with input systems 102 and 112, may enable the user to edit the input text, the translated text, or both, as is described in more detail below. Additionally, while FIG. 3 has been described as applying to output system 104, persons skilled in the art will appreciate that the same principles may be applied to output system 114 without departing from the spirit of the present invention.

Figure 4:
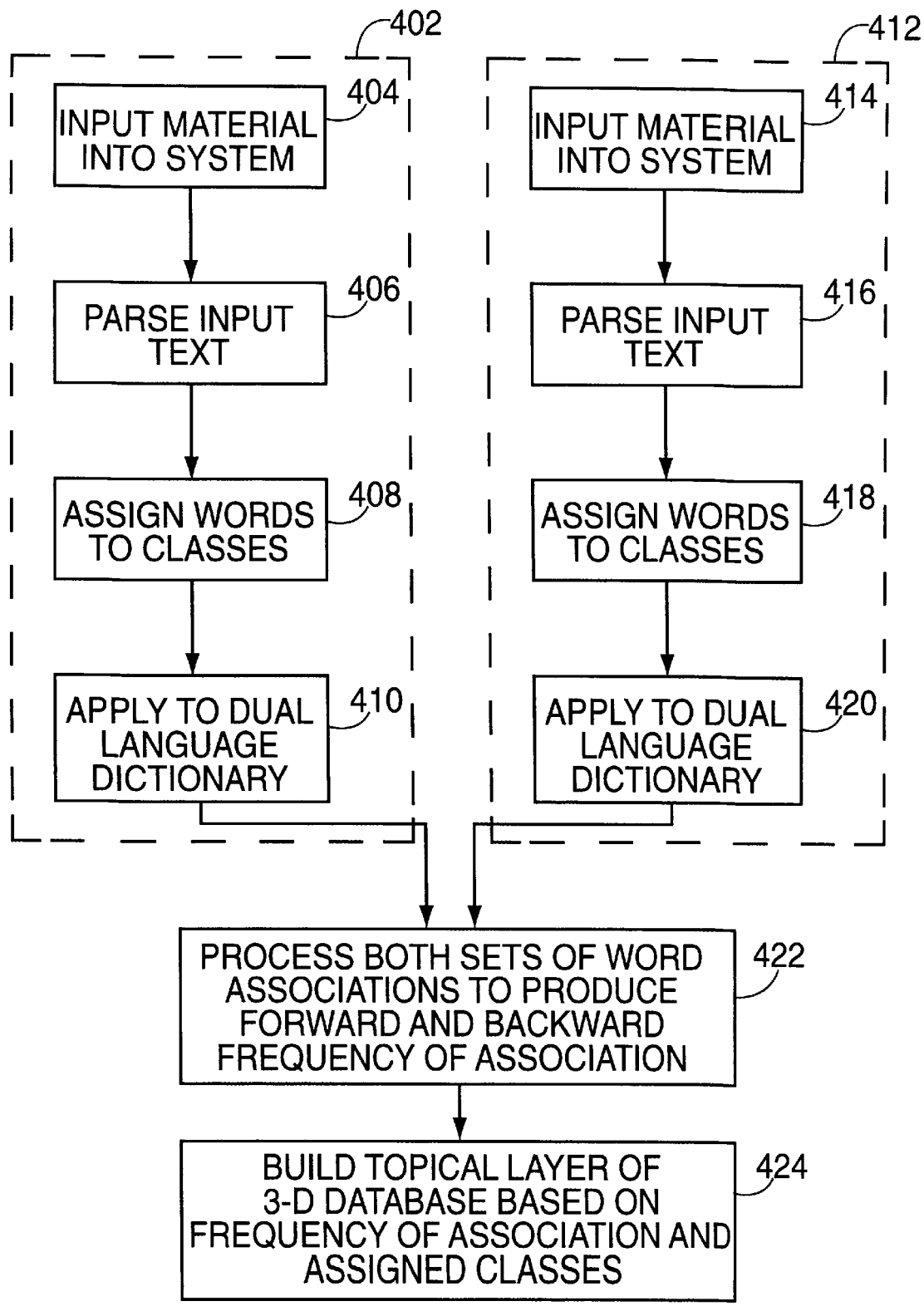
FIG. 4 is a flow diagram of a process for building a three-dimensional topical database using that translation system of FIG. 1 in accordance with the principles of the present invention.

FIG. 4 is a flow diagram that illustrates how three-dimensional topical dictionary 120 may be built in accordance with the principles of the present invention. The procedure shown in FIG. 4 includes two main branches 402 and 412 that may be carried out in parallel, in series or in any combination thereof, depending on the exact configuration of translation system 100. Each of branches 402 and 412 includes four steps (i.e., branch 402 includes steps 404–410 and branch 412 includes steps 414–420 that are essentially identical to steps 404–410 (and for that reason are not individually described below)) that result in a database having one or more target language translations associated with each word input from a source language.

The procedure shown in FIG. 4 is to be carried out for each topic that translations may be needed. Thus, when a user uses that system, as is described more fully below, the user selects the individual topic that translation system 100 uses to focus the translation on so that the translation is produced in a more accurate manner. The first step in producing one topical level of topical dictionary 120 is to input the material into the system (i.e., step 404). As described above, the step 404 may be carried out in a number of ways. For example, material may be input to system 100 via telephone 202, through which documents may be read orally, or scanner 206 and OCR circuitry/software 208 may be used to rapidly input multiple documents. Alternatively, material may be typed into video screen/keyboard 210.

Once the material has been input into system 100, processor 106 processes the input information, in a step 406, to parse the input material into individual words. Parsing is a well known procedure for converting the individual input characters into words (e.g., building a word by including all of the characters between two spaces). Parsing is followed by assigning the words to word classes (i.e., in a step 408). These classes are based, at least in part, on information such as the grammatical function (e.g., is the word a subject, modifier or an object), grammatical form (e.g., is the word a possessive noun or a tensed verb) and denotation. After the word classes have been assigned, processor 106 processes, in a step 410, the input words against dual-language dictionary 122 to produce one or more translations for each input word in the target language.

Figure 5:
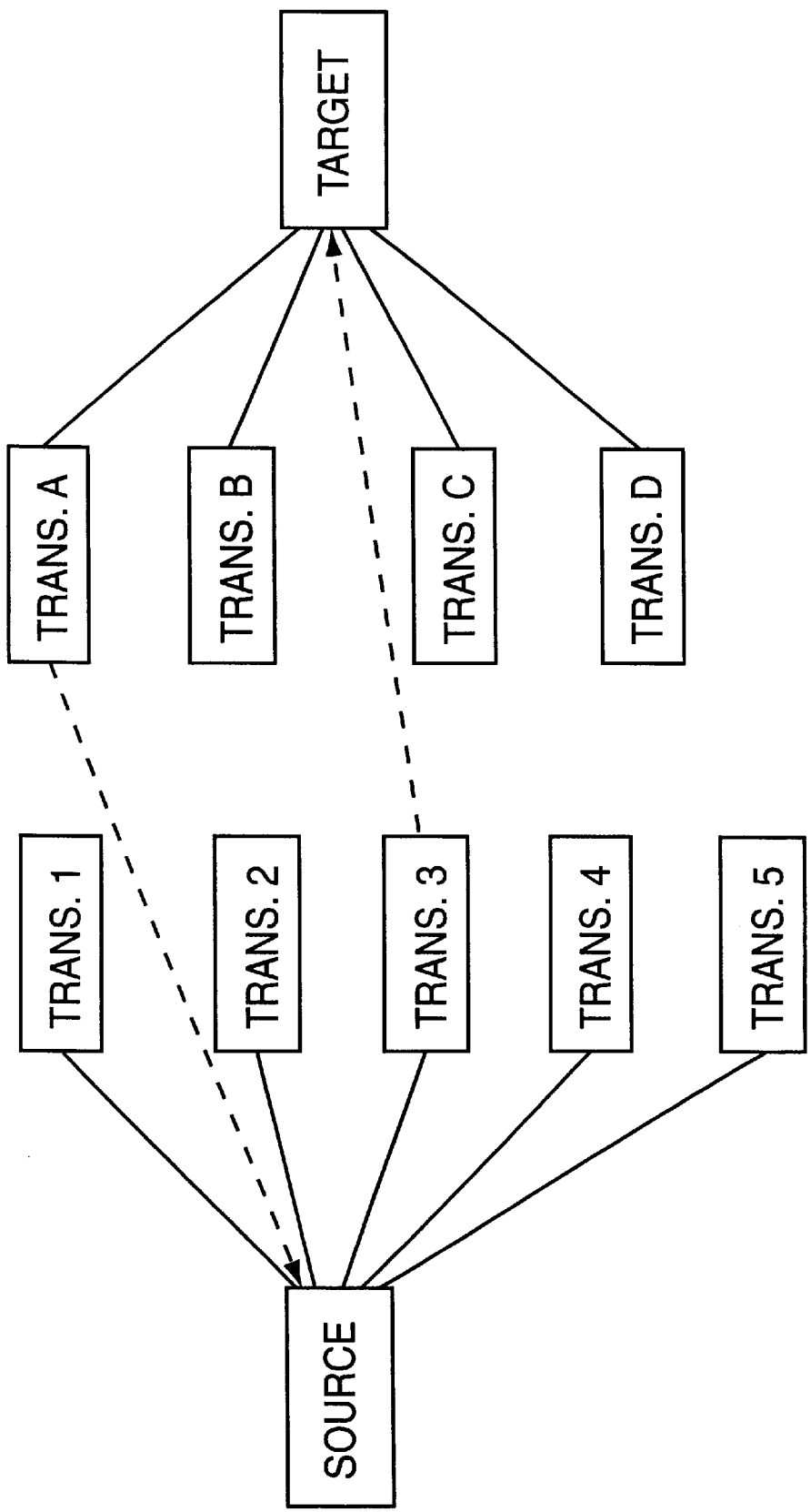
FIG. 5 is a schematic diagram showing an illustrative example of a portion of the procedure used to build the three-dimensional database in FIG. 4.

After branches 402 and 412 have been executed for all of the available materials (or for at least enough materials so that system performance is robust), processor 106, in a step 422, processes the word associations. For example, processor 106 may apply the word associations from each branch to form a neural network that determines the bi-directional frequency of association for each word. This is shown in FIG. 5, assuming that a word in the source language (e.g., English) has five translations (TRANS. 1–TRANS. 5) in the target language (e.g, Japanese) and a Japanese word has four English translations (TRANS. A–TRANS. D). In this example, TRANS. 3 is the exact same word as TARGET and TRANS. A is the exact same word as SOURCE. However, if the neural network finds that, for the selected topic, SOURCE has a significantly higher occurrence of being translated into TRANS. 4, than topical dictionary 120 will include the translation of SOURCE to TRANS. 4 instead of using TRANS. 3, as conventional translators might do.

The bi-directional frequencies of association are used by processor 106 during the application of a Markov Process during translation processing. The Markov Process may be used, for example, to determine the transitional probability of one word occurring after a first word has been determined. Additionally, and in accordance with the principles of the present invention, the results of the Markov Process will vary depending on the topic selected by the user. One example of this process is shown below in Table 1 in which a series of English words (shown merely as combinations of letters) are correlated to a series of Japanese words (illustrated as a series of numbers).

TABLE 1

|  |  | JAPANESE | | | | |
| --- | --- | --- | --- | --- | --- | --- |
|  |  | 126 | 254 | 367 | 476 | 597 |
| ENGLISH | ABD | .1 | .5 | .1 | 0 | .3 |
|  | FGW | .2 | .2 | .1 | 0 | .5 |
|  | UKS | 0 | 0 | .6 | .2 | .2 |
|  | OSL | 0 | 0 | .2 | .8 | 0 |
|  | PWJ | .7 | .3 | 0 | 0 | 0 |

For each word in English, the Markov Matrix in Table 1 defines a transition probability for each Japanese word that the English may translate to. For example, ABD may be translated into four different Japanese words (i.e., 126, 254, 367 and 597), however, for the selected topic, the highest probability is that ABD should be translated to 254 (a 50% probability). Each word in each row and column has a total of a 100% probability (e.g., word 367 has four probabilities that are summed to be equal to 1—0.1+0.1+0.6+0.2=1), which represents that fact that every word can be translated in each direction (i.e., from English to Japanese or from Japanese to English).

Once all of the words have been processed using the neural network, processor 106, in a step 424, updates topical dictionary 120 to include the topical layer for the selected topic. The process set forth in FIG. 4 may also be used to update any layer of the topical dictionary. In such an instance, the steps 410 and 420 would be carried out by applying the words against the existing layer of topical dictionary 120, before being applied against the proper dual-language dictionary 122. In this manner, the accuracy of the topical dictionary for the selected topic would be further improved.

Figure 6:
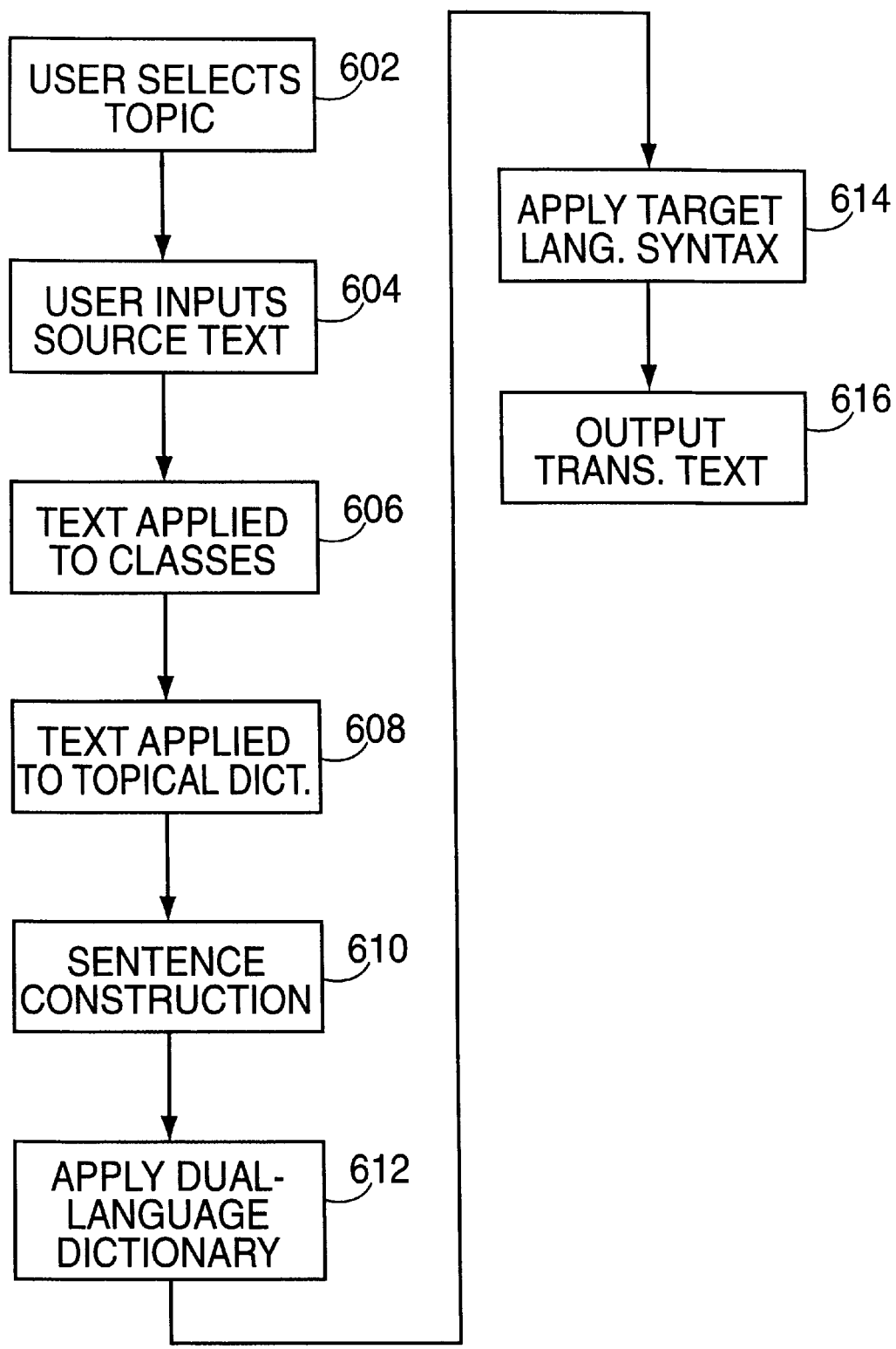
FIG. 6 is a flow diagram that illustrates the operation of the translation system of FIG. 1 in accordance with the principles of the present invention.

FIG. 6 shows a flow diagram that illustrates the operation of translation system 100 in accordance with the principles of the present invention. The method set forth in FIG. 6 may be used for a variety of purposes, even though, for the purposes of illustration, the context of the discussion is focused on a telephone conversation between two individuals that are each speaking in a different language. Additionally, for the sake of discussion, it is assumed that the translation system 100 being used in carrying out the steps shown in FIG. 6 includes combined input/output systems 102/104 and 112/114 that include a telephone 202/302 (including the circuitry 204/304 needed to process voice data) and a video screen/keyboard 210/310 for each party.

The first step occurs when the individual initiating the call, in a step 602, selects the topic of conversation (e.g., if two scientists are going to discuss the chemical composition of a new AIDS drug, the caller might select chemistry, pharmaceuticals, or AIDS, depending on the topical breadth of the system being used). The call is placed in a conventional manner and both users come on-line (step not shown). Each caller speaks into the telephone in a step 604 and the voice signals are processed until processor 106 receives signals representing the parsed input words in the source language. Processor 106, in a step 606, assigns classes to the words in a manner similar to that described above with regard to steps 408 and 418. Additionally, the input words may be processed using, for example, a Markov model to draw an association between the each input word and the surrounding words. The Markov model enables the system 100 to differentiate between homonyms (e.g., to, two and too), as well as to fill in missing words in the case when word phrases, and incomplete or partial sentences are spoken.

Processor 106 applies the input words against topical dictionary 120 to develop an initial translation into the target language in a step 608. Sentences are constructed by processor 106 in a step 610 by applying syntax rules 124 of the source language to the input words. Any additional translation (e.g., any other missing words) is accomplished by processing the information against dual-language dictionary 122 and by also applying grammatical rules 126 to the input words in a step 612. The input words and the associated translations are, in a step 614, processed by processor 106 against syntax rules 124 for the target language which results in a translated message that is stored in memory 108. The information is output to the recipient in a step 616 as text spoken in the target language through the telephone 202/302.

Additionally, as the individual speaks into telephone 202/302 during the step 604, the input words are displayed on video screen/keyboard 210/310 (once processor 106 receives them in a parsed state). The individual is thereby provided with the opportunity to interrupt processor 106 in order to revise the input message as necessary (e.g., if errors are detected in the voice recognition processing). At the same time as the words are synthesized in the target language, the recipient may also view the translated message on video screen/keyboard 210/310 and provide instant feedback if the translation is not understood. For example, if most of a sentence is understood, but one or two words are not, the individual could select the unclear words on video screen/keyboard 210/310 (e.g., by using a mouse or via a touch-screen input system (not shown)). The input would be provided back to the initiator, who could provide alternate text in the source language, which would then be translated in a different manner.

Persons skilled in the art will thus appreciate that the present invention can be practiced by other than the described embodiments, which are presented for purposes of illustration and not of limitation, and the present invention is limited only by the claims which follow. For example, a complete conversation could be had between two individuals speaking two different languages on-line utilizing only a pair of video screen/keyboards 210/310 instead of telephones 202/302, or the translation system of the present invention may be used to translate technical or otherwise specialized documents based on the use of the topical dictionary.

I claim:

1. A method of producing a topical dual-language dictionary for use in a topical, dual-language translation system, the method comprising:

inputting a first plurality of references in a first language into said translation system;

parsing said first plurality of references into a first plurality of individual words;

assigning said first plurality of parsed words from said first plurality of references to classes;

applying said first plurality of parsed words to said topical dual-language dictionary to produce translations of at least some of said first plurality of parsed words;

applying any untranslated parsed words from said first plurality of parsed words to a conventional dual-language dictionary to produce translations of said untranslated first plurality of parsed words;

inputting a second plurality of references in a second language into said translation system;

parsing said second plurality of references into a second plurality of individual words;

assigning said second plurality of parsed words from said second plurality of references to classes;

applying said second plurality of parsed words to said topical dual-language dictionary to produce translations of at least some of said second plurality of parsed words;

applying any untranslated parsed words from said second plurality of parsed words to said conventional dual-language dictionary to produce translations of said untranslated second plurality of parsed words;

processing words associations between said first and second pluralities of translated words to produce forward and backward frequency of associations; and updating said topical dictionary based on said frequency of associations.

2. The method of claim 1, wherein inputting a first plurality of references comprises:

receiving oral voice signals from a telephone; and processing said voice signals using voice recognition circuitry to produce electronic signals representative of said voice signals.

3. The method of claim 1, wherein inputting a first plurality of references comprises:

receiving signals from a scanner; and processing said scanner signals using optical character recognition circuitry to convert said scanned signals into textual information.

4. The method of claim 1, wherein inputting a first plurality of references comprises:

receiving textual information via a computer keyboard.

5. The method of claim 1, wherein assigning said first plurality of parsed words comprises:

determining the grammatical function of at least a majority of said individual words.

6. The method of claim 1, wherein assigning said first plurality of parsed words comprises:

determining the grammatical form of at least a majority of said individual words.

7. The method of claim 1, wherein assigning said first plurality of parsed words comprises:

determining the denotation of at least a majority of said individual words.

8. The method of claim 1, wherein assigning said first plurality of parsed words comprises:

determining the grammatical function of at least a majority of said individual words;

determining the grammatical form of at least a majority of said individual words; and determining the denotation of at least a majority of said individual words.

9. The method of claim 1, further comprising:

applying said individual words against a Markov model that associates each individual word against the individual words surrounding each individual word, at least to reduce synonym occurrences.

10. A system for producing a topical dual-language dictionary for use in a topical, dual-language translation system, the system comprising:

input circuitry that receives input references;

processing circuitry that parses a first plurality of references into a first plurality of individual words and assigns said first plurality of parsed words to classes;

processing circuitry that applies said first plurality of parsed words to said topical dual-language dictionary to produce translations of at least some of said first plurality of parsed words, and that applies any untranslated parsed words from said first plurality of parsed words to a conventional dual-language dictionary to produce translations of said untranslated first plurality of parsed words;

processing circuitry that parses a second plurality of references into a second plurality of individual words and assigns said second plurality of parsed words to classes;

processing circuitry that applies said second plurality of parsed words to said topical dual-language dictionary to produce translations of at least some of said second plurality of parsed words, and that applies any untranslated parsed words from said second plurality of parsed words to said conventional dual-language dictionary to produce translations of said untranslated second plurality of parsed words; and processing circuitry that processes word associations between said first and second pluralities of translated words to produce forward and backward frequency of associations, said topical dictionary being updated based on said frequency of associations.

11. The system for producing a topical dictionary of claim 10, wherein said input circuitry comprises:

a telephone; and voice recognition circuitry.

12. The system for producing a topical dictionary of claim 10, wherein said input circuitry comprises:

a scanner; and optical character recognition circuitry.

13. The system for producing a topical dictionary of claim 10, wherein said input circuitry comprises:

a computer terminal including a video screen and keyboard.

14. The system for producing a topical dictionary of claim 13, wherein said video screen displays said input messages and said computer terminal further comprises means for revising said input message.

15. The system for producing a topical dictionary of claim 13, wherein said computer terminal further comprises:

means for indicating to an operator that one or more words of said translated message are unclear.

* * * * *